US008432519B2

(12) United States Patent
Yoshida et al.

(10) Patent No.: US 8,432,519 B2
(45) Date of Patent: Apr. 30, 2013

(54) LIQUID CRYSTAL DISPLAY DEVICE

(75) Inventors: Masahiro Yoshida, Osaka (JP);
Takahiro Sasaki, Osaka (JP); Yasunao Iwata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 15 days.

(21) Appl. No.: 13/322,032

(22) PCT Filed: May 24, 2010

(86) PCT No.: PCT/JP2010/058752
§ 371 (c)(1),
(2), (4) Date: Nov. 22, 2011

(87) PCT Pub. No.: WO2010/137560
PCT Pub. Date: Dec. 2, 2010

(65) Prior Publication Data
US 2012/0062827 A1   Mar. 15, 2012

(30) Foreign Application Priority Data

May 26, 2009   (JP) .................................. 2009-126879

(51) Int. Cl.
*G02F 1/1337*   (2006.01)
(52) U.S. Cl.
USPC ........................... 349/129; 349/123; 349/124
(58) Field of Classification Search .......... 349/123–124, 349/129
See application file for complete search history.

(56) References Cited

U.S. PATENT DOCUMENTS

| 6,661,488 | B1 | 12/2003 | Takeda et al. |
| 6,724,452 | B1 | 4/2004 | Takeda et al. |
| 7,405,789 | B1 | 7/2008 | Sasaki et al. |
| 2004/0169777 | A1 | 9/2004 | Tanaka et al. |
| 2005/0213008 | A1 | 9/2005 | Kubo et al. |
| 2006/0227274 | A1 | 10/2006 | Do et al. |

FOREIGN PATENT DOCUMENTS

| EP | 1 659 444 A2 | 5/2006 |
| JP | 11-242225 | 9/1999 |
| JP | 2003-043488 | 2/2003 |
| JP | 2005-049740 | 2/2005 |
| JP | 2006-259776 | 9/2006 |

OTHER PUBLICATIONS

International Search Report for PCT/JP2010/058752, mailed Aug. 10, 2010.
English translation of the International Preliminary Report on Patentability mailed Dec. 22, 2011 in corresponding PCT Application No. PCT/JP2010/058752.

*Primary Examiner* — Phu Vu
(74) *Attorney, Agent, or Firm* — Nixon & Vanderhye, P.C.

(57) ABSTRACT

A pixel includes a plurality of first linear alignment regulating structures (22) provided on the liquid crystal layer side of a first substrate and a plurality of second linear alignment regulating structures (44) provided on the liquid crystal layer side of a second substrate. The first and second linear alignment regulating structures each have a first component (22a, 44a) extending along a first axis and a second component (22b, 44b) extending along a second axis which is different from the first axis, the second linear alignment regulating structures being linear dielectric protrusions. The liquid crystal display device further includes a connection dielectric protrusion (45a, 45b, 45c) for interconnecting two linear dielectric protrusions which belong to pixels adjoining each other and which are not collinear. The connection dielectric protrusion has a plurality of edges, the plurality of edges including at least one edge extending in a direction which is different from the direction of an edge of the first electrode (21) and different from the direction of an edge of the linear dielectric protrusion. According to the present invention, an enhanced design freedom can be obtained without deteriorating the display quality of an MVA-mode liquid crystal display device.

7 Claims, 9 Drawing Sheets

(a)

(b)

LIQUID CRYSTAL DISPLAY DEVICE

This application is the U.S. national phase of International Application No. PCT/JP2010/058752, filed 24 May 2010, which designated the U.S. and claims priority to JP Application No. 2009-126879, filed 26 May 2009, the entire contents of each of which are hereby incorporated by reference.

TECHNICAL FIELD

The present invention relates to a liquid crystal display device (LCD: Liquid Crystal Display), and in particular to a VA (Vertical Alignment) type LCD (VA mode LCD).

BACKGROUND ART

In recent years, as display methods for liquid crystal display devices, wide viewing angle modes such as the MVA (Multidomain Vertical Alignment) mode and the IPS (In-Plain Switching) mode have been proposed. Among others, due to being a vertical alignment mode, the MVA mode is characterized by a higher contrast ratio than that of the IPS mode, and is widely used for applications such as TV sets.

In an MVA-type liquid crystal display device, on the liquid crystal layer sides of a pair of substrates opposing each other with a vertical-alignment type liquid crystal layer interposed therebetween, alignment regulating structures (also referred to as domain regulating structures) are provided so as to form a plurality of liquid crystal domains whose directors are in different alignment directions (directions of tilt). As the alignment regulating structures, apertures (slits) provided in the electrodes or dielectric protrusions (ribs) formed on the liquid crystal layer side of the electrodes are used (Patent Document 1).

Typically, on each of the pair of substrates, alignment regulating structures in straight-line form extending in two directions that are orthogonal to each other (hereinafter referred to as "linear alignment regulating structures") are provided, such that, when viewed from a direction which is perpendicular to the substrates, the linear alignment regulating structures formed on one substrate and the linear alignment regulating structures provided on the other substrate appear parallel and alternating. As a result, when a voltage is applied across the liquid crystal layer in an arbitrary pixel, four domains are created in between the linear alignment regulating structures, whose liquid crystal molecules would fall in azimuths (also called the azimuths of liquid crystal domain directors) which are mutually apart by about 90°. Typically, four liquid crystal domains are created the azimuth angles of whose liquid crystal domain directors constitute 45° with respect to the polarization axes (transmission axes) of a pair of polarizers which are placed in crossed Nicols. When an azimuth angle of 0° is the direction of the polarization axis of one polarizer (e.g., the horizontal direction on the display surface) and positive azimuths are defined in the counterclockwise direction, the azimuth angles of the directors of the four liquid crystal domains are 45°, 135°, 225°, and 315°.

Note that a "pixel" in the present specification refers to the smallest unit by which a liquid crystal display device performs displaying, and in the case of a color display device, refers to the smallest unit that displays each individual primary color (typically R, G, or B), occasionally referred to as a "dot".

As described above, in a typical MVA-type liquid crystal display device, the linear alignment regulating structures extend at an angle of 45° with respect to the horizontal direction (and the vertical direction). On the other hand, a typical pixel electrode has an edge extending along the horizontal direction or the vertical direction, and an oblique electric field (fringe field) is generated also near the edge of the pixel electrode. Therefore, near the edge of the pixel electrode, liquid crystal molecules may be aligned in a direction which is different from the direction of alignment regulation by the linear alignment regulating structures, whereby a schlieren texture may be formed. When liquid crystal molecules are aligned in a direction which is different from the direction of alignment regulation by the linear alignment regulating structures in this manner, the display quality (particularly luminance) is deteriorated.

According to Patent Document 1, an improvement in display quality is possible by providing auxiliary alignment regulating structures close to the portion near the edge of the pixel electrode where a schlieren texture is observed. The auxiliary alignment regulating structures are formed so as to be integral with the linear alignment regulating structures which are provided on the counter electrode (i.e., on the liquid crystal layer side of the counter electrode). Due to an alignment regulating force from the auxiliary alignment regulating structures, the alignment of the liquid crystal molecules near the edge of the pixel electrode matches the alignment of the liquid crystal molecules in the central portion of the pixel, so that no schlieren texture is formed and the display quality is improved. The entire disclosure of Patent Document 1 is incorporated herein by reference.

CITATION LIST

Patent Literature

[Patent Document 1] Japanese Laid-Open Patent Publication No. 11-242225 (the specification of U.S. Pat. No. 6,724,452)

SUMMARY OF INVENTION

Technical Problem

However, as the pixel resolution increases in recent years, the construction using auxiliary alignment regulating structures disclosed in Patent Document 1 faces a problem of having little design freedom. For example, columnar spacers for defining a thickness (hereinafter "cell gap") between the glass substrates need to be disposed so as to avoid the auxiliary alignment regulating structures. Employing shorter auxiliary alignment regulating structures in order to guarantee regions for disposing columnar spacers would result in a decrease in display quality.

The present invention has been made in view of the above problems, and an objective thereof is to increase the design freedom without lowering the display quality.

Solution to Problem

A liquid crystal display device according to the present invention is a liquid crystal display device comprising: a first substrate; a second substrate; a vertical-alignment type liquid crystal layer provided between the first substrate and the second substrate; a first electrode provided on the liquid crystal layer side of the first substrate; a second electrode provided on the liquid crystal layer side of the second substrate; and a plurality of pixels, wherein, each of the plurality of pixels includes a plurality of first linear alignment regulating structures provided on the liquid crystal layer side of the first substrate and a plurality of second linear alignment regulating structures provided on the liquid crystal layer side of the second substrate; the plurality of first linear alignment regulating structures and the plurality of second linear alignment regulating structures each have a first component extending along a first axis and a second component extending along a second axis which is different from the first axis, the plurality of second linear alignment regulating structures being a plurality of linear dielectric protrusions; the liquid crystal display device further comprises a connection dielectric protrusion provided on the liquid crystal layer side of the second substrate, the connection dielectric protrusion interconnecting a linear dielectric protrusion belonging to a given pixel and a linear dielectric protrusion which belongs to a pixel adjoining the given pixel and which is not collinear with the linear dielectric protrusion belonging to the given pixel; and the connection dielectric protrusion has a plurality of edges, the plurality of edges including at least one edge extending in a direction which is different from a direction of an edge of the first electrode and different from a direction of an edge of the linear dielectric protrusion.

In one embodiment, the at least one edge of the connection dielectric protrusion includes at least one first edge such that an angle constituted by the at least one first edge and an edge of the first electrode extending along a column direction is greater than 0° and smaller than an angle constituted by the first axis or second axis and the edge of the first electrode extending along the column direction.

In one embodiment, the angle constituted by the first axis or second axis and the edge of the first electrode extending along the column direction is about 45°; and the angle constituted by the at least one first edge of the connection dielectric protrusion and the edge of the first electrode extending along the column direction is about 22.5 degrees.

In one embodiment, the at least one first edge of the connection dielectric protrusion intersects the edge of the first electrode extending along the column direction.

In one embodiment, the at least one first edge of the connection dielectric protrusion further includes at least one second edge such that an angle constituted by the at least one second edge and the edge of the first electrode extending along the column direction is greater than the angle constituted by the first axis or second axis and the edge of the first electrode extending along the column direction.

In one embodiment, the angle constituted by the at least one second edge of the connection dielectric protrusion and the edge of the first electrode extending along the column direction is about 90°.

In one embodiment, the at least one second edge of the connection dielectric protrusion intersects the edge of the first electrode extending along the column direction.

In one embodiment, the plurality of first linear alignment regulating structures are a plurality of linear apertures (slits). As the plurality of first linear alignment regulating structures, a plurality of linear dielectric protrusions can be used.

Advantageous Effects of Invention

According to the present invention, without lowering the display quality of an MVA-type liquid crystal display device, it is possible to provide an enhanced design freedom.

DESCRIPTION OF EMBODIMENTS

Hereinafter, with reference to the drawings, an MVA-type liquid crystal display device according to an embodiment of the present invention will be described.

First, with reference to FIGS. 1(*a*) and (*b*), the fundamental construction of an MVA-type liquid crystal display device according to an embodiment of the present invention will be described.

Figure 1:
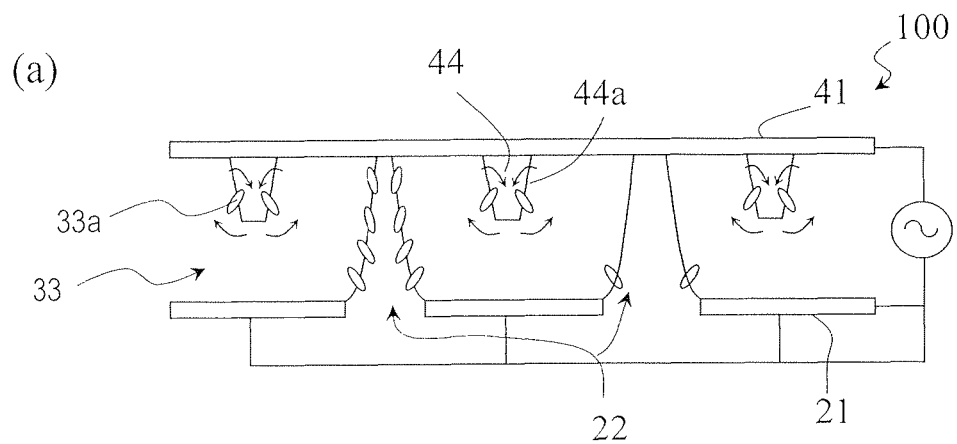
[FIG. 1] (*a*) is a schematic cross-sectional view of a pixel of a liquid crystal display device 100 according to an embodiment of the present invention; and (*b*) is a plan view showing azimuths of the directors of four liquid crystal domains A, B, C, and D which are created in a pixel of the liquid crystal display device 100.
Figure 1:
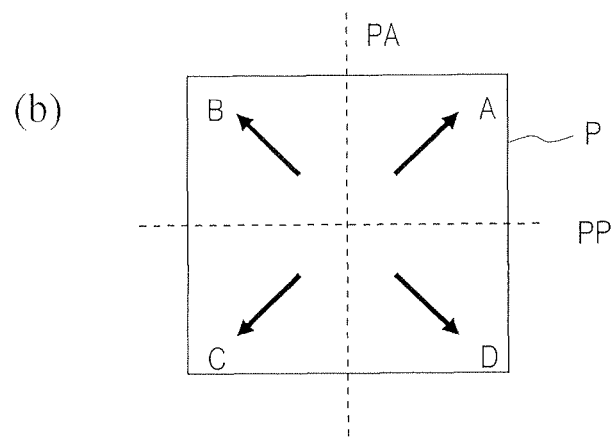

FIG. 1(*a*) shows a schematic cross-sectional view of a pixel of a liquid crystal display device 100 according to an embodiment of the present invention. As shown in FIG. 1(*a*), the liquid crystal display device 100 has a plurality of pixels each including: a first electrode (e.g. a pixel electrode) 21 formed on a first substrate (not shown); a second electrode (e.g., a counter electrode) 41 being formed on a second substrate (not shown) and opposing the first electrode 21; and a vertical-alignment type liquid crystal layer 33 provided between the first electrode 21 and the second electrode 41. In the vertical-alignment type liquid crystal layer 33, in the absence of an applied voltage, liquid crystal molecules 33*a* having negative dielectric anisotropy are aligned substantially perpendicular (e.g., no less than 87° and no more than 90°) to the planes of the first electrode 21 and the second electrode 41. Typically, it is obtained by providing a vertical alignment film (not shown) on the surface of each of the first electrode 21 and the second electrode 41 facing the liquid crystal layer 33. Note that, in the case where linear dielectric protrusions (ribs) or the like are provided as linear alignment regulating structures, the liquid crystal molecules 33*a* will be aligned substantially perpendicular to the surfaces of the linear dielectric protrusions or the like facing the liquid crystal layer.

In the liquid crystal display device 100, linear apertures 22 are provided on the first electrode 21 side of the liquid crystal layer 33 as first linear alignment regulating structures, and linear dielectric protrusions 44 are provided on the second electrode 41 side of the liquid crystal layer 33 as second linear alignment regulating structures. In a liquid crystal region defined by a first linear alignment regulating structure and a second linear alignment regulating structure, the liquid crystal molecules 33a receive alignment regulating forces from the first linear alignment regulating structures and the second linear alignment regulating structures (which may be collectively referred to as "linear alignment regulating structures"), and fall (tilt) in a direction shown by an arrow in the figure when a voltage is applied between the first electrode 21 and the second electrode 41. In other words, the liquid crystal molecules 33a will fall in a uniform direction in each liquid crystal region, and thus each liquid crystal region can be regarded as a domain. An azimuth in which the liquid crystal molecules fall under an applied voltage in each liquid crystal domain is referred to as the azimuth of a director of the liquid crystal domain.

The liquid crystal display device 100 has the linear apertures (slits) 22 formed on the first electrode 21 as first linear alignment regulating structures, and the linear dielectric protrusions 44 formed on the liquid crystal layer 33 side of the second electrode 41 as second linear alignment regulating structures, such that the linear apertures 22 and the linear dielectric protrusions 44 each extend in straight-line form (in belt shapes or strip shapes). Each linear dielectric protrusion 44 causes the liquid crystal molecules 33a to be aligned substantially perpendicular to side faces 44a thereof, thereby acting to align the liquid crystal molecules 33a in a direction which is orthogonal to the direction that the linear dielectric protrusions 44 extend. Each linear aperture 22 generates an oblique electric field in the liquid crystal layer 33 near an edge of the linear aperture 22 when a potential difference is created between the first electrode 21 and the second electrode 41, thereby acting to align the liquid crystal molecules 33a in a direction which is orthogonal to the direction that the linear apertures 22 extend.

The linear apertures 22 and the linear dielectric protrusions 44 are disposed in parallel to one another at a certain interval, such that a liquid crystal domain is formed between each adjoining pair of a linear aperture 22 and a linear dielectric protrusion 44. FIG. 1(a) is a cross-sectional view along a direction which is orthogonal to the direction that the linear alignment regulating structures extend. As can be seen from FIG. 1(a), two liquid crystal domains appear on both sides of each linear alignment regulating structure, such that the directions in which the liquid crystal molecules 33a fall, i.e., azimuths of their directors, are 180° apart.

Since the first linear alignment regulating structures and the second linear alignment regulating structures each have two linear components (linear portions) extending in two directions that are orthogonal to each other, two liquid crystal domains are formed corresponding to the respective linear components. As a result, four liquid crystal domains can be formed whose directors are in azimuths that are mutually apart by about 90°.

FIG. 1(b) is a schematic plan view showing an exemplary liquid crystal domain layout in one pixel of the MVA-type liquid crystal display device according to an embodiment of the present invention. In FIG. 1(b), PP represents the polarization axis of a polarizer on the rear face side (backlight side), whereas PA represents the polarization axis of a polarizer on the viewer's side. As shown in FIG. 1(b), in the case of a typical pixel (a pixel not having a multi-pixel structure), four liquid crystal domains A, B, C, and D whose directors are aligned in azimuths that are mutually apart by about 90° are created within one pixel P. Assuming that the polarization axis PP has an azimuth angle of 0° and that positive azimuths are defined in the counterclockwise direction, the respective directors of the four domains A, B, C, and D are in azimuths of 45°, 135°, 225°, and 315°. Hereinafter, any azimuth angle will be discussed according to this definition, unless otherwise specified.

In the case where one traditional pixel is divided into two or more subpixels and different voltages are applied to different subpixels, such that the luminance of one traditional pixel is represented by an average of the luminances (gray scale levels) of the plurality of subpixels (called a multi-pixel structure or a pixel split structure), the entire pixel may include the four domains A, B, C, and D. Needless to say, the first and second linear alignment regulating structures may be disposed in such a manner that the four liquid crystal domains A to D are created in each subpixel.

Note that the specific arrangement order of the four domains A, B, C, and D is determined by the layout of the linear alignment regulating structures. For example, the liquid crystal domains A and C are created on both sides of any linear regulating structure extending in an azimuthal direction of 135° (or 315°), whereas the liquid crystal domains B and D are created on both sides of any linear regulating structure extending in an azimuthal direction of 45° (or 225°). In order to ensure uniform viewing angle characteristics, it is preferable that the respective total areas of the four liquid crystal domains A to D are equal to one another.

Referring to FIG. 2A, FIG. 2B, FIG. 2C, and FIGS. 3(a) to (d), the construction of a liquid crystal display device according to a first embodiment of the present invention will be described in comparison with the construction of the liquid crystal display device described in Patent Document 1.

Figure 2A:
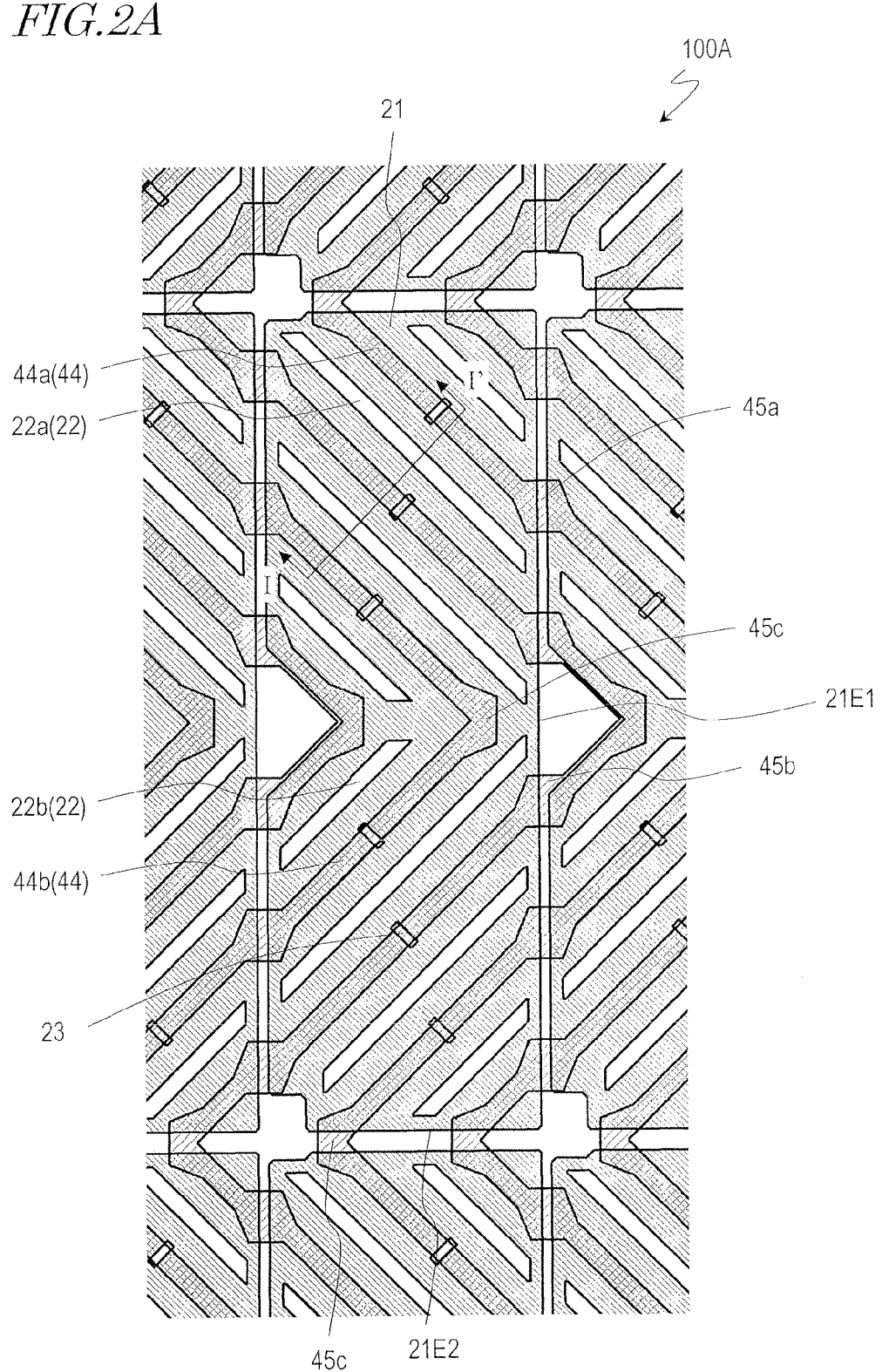
[FIG. 2A] A plan view schematically showing the structure of a pixel of a liquid crystal display device 100A according to a first embodiment of the present invention.
Figure 2B:
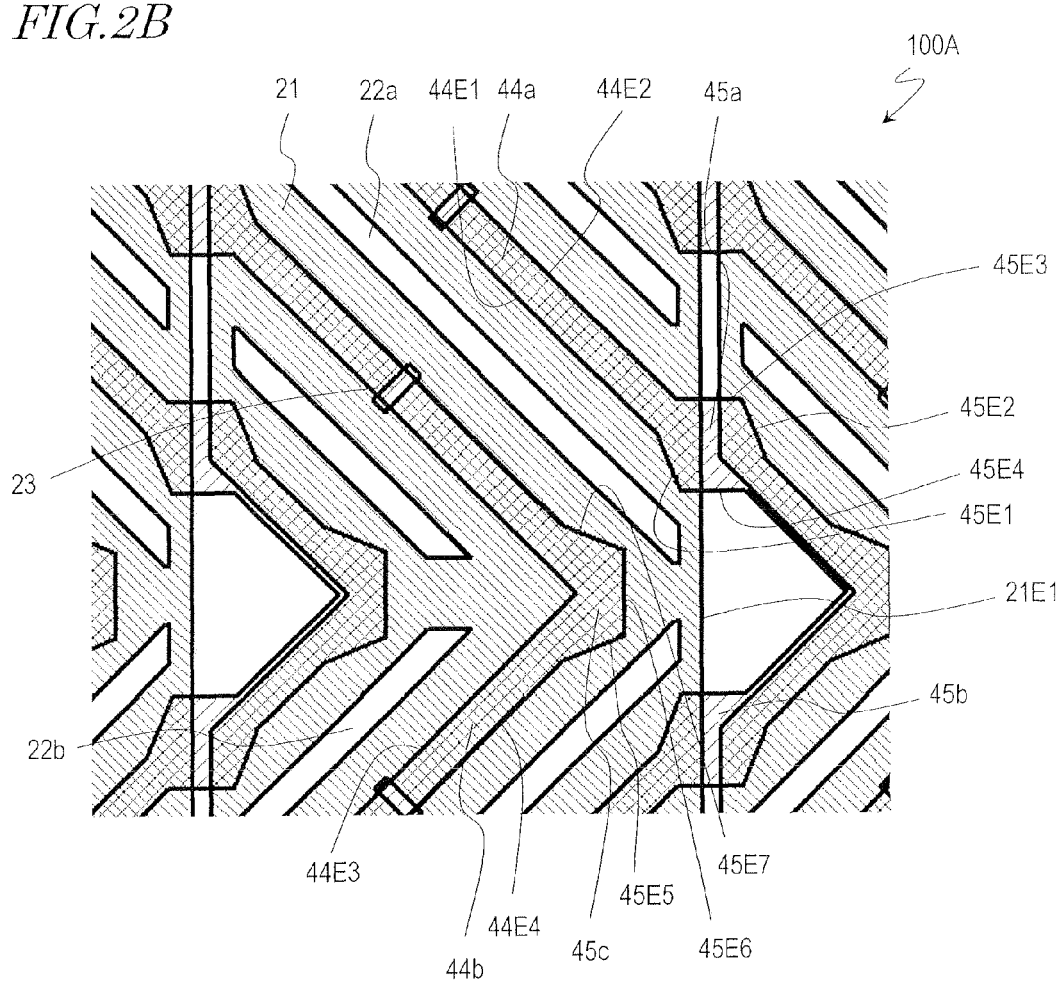
[FIG. 2B] A partially enlarged view of the neighborhood of the center of the pixel shown in FIG. 2A.
Figure 2C:
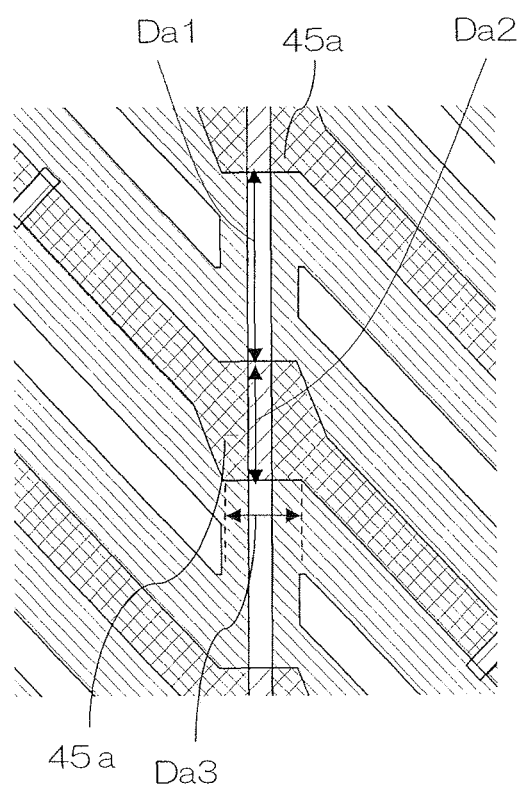
[FIG. 2C] A partially enlarged view of the neighborhood of the center of the pixel shown in FIG. 2A for illustrating the size of connection dielectric protrusions.

FIG. 2A is a plan view schematically showing the structure of a pixel of the liquid crystal display device 100A according to the first embodiment of the present invention. FIG. 2B and FIG. 2C are partially enlarged views of the neighborhood of the center of the pixel shown in FIG. 2A.

FIG. 2A shows a layout of: a pixel electrode 21 of the liquid crystal display device 100A according to the first embodiment of the present invention; a plurality of linear apertures (first linear alignment regulating structures) 22 formed on the pixel electrode 21; and a plurality of linear dielectric protrusions (second linear alignment regulating structures) 44 formed on the liquid crystal layer side of the counter electrode.

The pixel electrode 21 is formed on the first substrate (e.g., a glass substrate, not shown), and is formed in a region which is surrounded by a gate bus line extending along a row direction (horizontal direction) and a source bus line extending along a column direction (vertical direction). Near the intersection between the gate bus line and the source bus line is formed a TFT. Via the TFT at the lower left portion of the pixel electrode 21, the pixel electrode 21 is electrically connected to the source bus line. A drain of the TFT and the pixel electrode 21 are electrically interconnected within a contact hole which is formed in a gate insulating film and/or an interlayer insulating film. These electrical constituents of a TFT-type liquid crystal display device are known (see, for example, Patent Document 1), and their illustration and detailed description are omitted here.

The counter electrode is formed on the second substrate (e.g., glass substrate, not shown), and the linear dielectric protrusions 44 are formed on the counter electrode, i.e., on the liquid crystal layer side (see FIG. 1(a)). The second substrate may include a color filter layer and a black matrix (light shielding layer) as necessary.

Each linear aperture 22 has a first component 22a extending along a first axis (azimuth angle: 135° or 315°) and a second component 22b extending along a second axis (azimuth angle: 225° or 45°) different from the first axis. Similarly, each linear dielectric protrusion 44 includes a first component 44a extending along the first axis and a second component 44b extending along the second axis. The first axis and the second axis are orthogonal to each other, such that the first axis and the second axis each bisect an angle formed by the polarization axes (transmission axes) PP and PA of the two polarizers.

As shown in FIG. 2A, when viewed from a direction which is perpendicular to the display surface, the first components 22a of the linear apertures 22 and the first components 44a of the linear dielectric protrusions 44 are alternately disposed along a direction which is orthogonal to the first axis, and their structure in a cross section along line I-I' in FIG. 2A is equivalent to the cross-sectional structure shown in FIG. 1(a). Similarly, the second components 22b of the linear apertures 22 and the second components 44b of the linear dielectric protrusions 44 are also alternately disposed along a direction which is orthogonal to the second axis, and have a cross-sectional structure which is equivalent to the cross-sectional structure shown in FIG. 1(a).

Moreover, the linear dielectric protrusions 44 and the linear apertures 22 are disposed axisymmetrically with respect to a line passing through the column-direction center of the pixel and extending along the row direction. In other words, the only linear dielectric protrusions 44 and linear apertures 22 existing in an upper half of the pixel are the first components 44a and 22a extending along the first axis, and the only linear dielectric protrusions 44 and linear apertures 22 existing in a lower half of the pixel are the second components 44b and 22b extending along the second axis. When folded back along a fold line which is the line passing through the column-direction center of the pixel and extending along the row direction, the first components (44a, 22a) of the linear dielectric protrusions 44 and linear apertures 22 overlie the second components (44b, 22b).

Note that the pixel electrode 21 shown in FIG. 2A has apertures 23 which function as substructures for fixing the alignment boundaries of the liquid crystal molecules created by the linear dielectric protrusions 44 at certain positions. The apertures 23 may be omitted, or other substructures described in Japanese Laid-Open Patent Publication No. 2006-259776 may be used instead. The entire disclosure of Japanese Laid-Open Patent Publication No. 2006-259776 is incorporated herein by reference.

The aforementioned construction is common to the liquid crystal display devices of Comparative Examples 1 and 2, the second embodiment, and Comparative Examples 3 and 4 to be described later, and its description will hereinafter be omitted.

The liquid crystal display device 100A further includes connection dielectric protrusions 45a and 45b which are formed on the liquid crystal layer side of the second substrate. The connection dielectric protrusions 45a and 45b connect the linear dielectric protrusions 44 belonging to a given pixel to those linear dielectric protrusions 44 which belong to a pixel adjoining the given pixel and which are not collinear with the linear dielectric protrusions of the given pixel. The connection dielectric protrusions 45a interconnect the first components 44a of the linear dielectric protrusions 44 belonging to pixels adjoining each other along the row direction, whereas the connection dielectric protrusions 45b interconnect the second components 44b of the linear dielectric protrusions 44 belonging to pixels adjoining each other along the row direction. The connection dielectric protrusions 45a and 45b have a plurality of edges, the plurality of edges including at least one edge extending in a direction which is different from the directions of the edges of the pixel electrode 21 and different from the directions of the edges of the linear dielectric protrusions 44. The connection dielectric protrusions 45a and 45b act to suppress disorder in the alignment of the liquid crystal molecules near an edge 21E1 of the pixel electrode 21 extending along the column direction, similarly to the auxiliary alignment regulating structures described in Patent Document 1.

Moreover, the liquid crystal display device 100A includes connection dielectric protrusions 45c. Each connection dielectric protrusion 45c interconnects the first component 44a and the second component 44b of a linear dielectric protrusion 44. A connection dielectric protrusion 45c is also formed at any portion at which the first component 44a and the second component 44b of the linear dielectric protrusions 44 belonging to pixels adjoining each other along the column direction are to be connected. The connection dielectric protrusions 45c also have a plurality of edges, the plurality of edges including at least one edge extending in a direction which is different from the directions of the edges of the pixel electrode 21 and different from the directions of the edges of the linear dielectric protrusions 44. The connection dielectric protrusions 45c also act to suppress disorder in the alignment of the liquid crystal molecules near an edge 21E2 of the pixel electrode 21 extending along the row direction, similarly to the auxiliary alignment regulating structures described in Patent Document 1.

With reference to FIG. 2B, the structure of the connection dielectric protrusions 45a, 45b, and 45c will be described in more detail.

The first component 44a of a linear dielectric protrusion 44 has two edges 44E1 and 44E2. The two edges 44E1 and 44E2 extend along the first axis, and are parallel to each other. The first components 44a of the linear dielectric protrusions 44 belonging to pixels adjoining along the row direction are not collinear. In other words, even if the first component 44a of a linear dielectric protrusion 44 belonging to a given pixel is extended, it does not overlap (coincide with) the edges 44E1 and 44E2 of the first component 44a of any linear dielectric protrusion 44 belonging to any adjoining pixel along the row direction.

The second component 44b of a linear dielectric protrusion 44 has two edges 44E3 and 44E4. The two edges 44E3 and 44E4 extend along the second axis, and are parallel to each other. The second components 44b of the linear dielectric protrusions 44 belonging to pixels adjoining along the row direction are not collinear. In other words, even if the second component 44b of a linear dielectric protrusion 44 belonging to a given pixel is extended, it does not overlap (coincide with) the edges 44E3 and 44E4 of the second component 44b of any linear dielectric protrusion 44 belonging to any adjoining pixel along the row direction.

Each connection dielectric protrusion 45a has edges 45E1, 45E2, 45E3, and 45E4. The edges 45E1, 45E2, 45E3, and 45E4 all differ from the edges 44E1 and 44E2 of the first component 44a of any linear dielectric protrusion 44 in terms of the directions they extend. Although the connection dielectric protrusions 45a are formed integrally with the linear dielectric protrusions 44a, the directions in which their edges 45E1, 45E2, 45E3, and 45E4 extend are different from the direction (parallel to the first axis) in which the edges 44E1 and 44E2 of the first components 44a of the linear dielectric protrusions 44 extend, which makes the connection dielectric protrusions 45a identifiable.

An angle which the edges 45E1 and 45E2 of each connection dielectric protrusion 45a constitute with an edge 21E1 of the pixel electrode 21 extending along the column direction is greater than 0° and smaller than the angle (45°) which is constituted by the first axis and the edge 21E1 of the pixel electrode 21 extending along the column direction. In the example shown in FIG. 2B, the angle which the edges 45E1 and 45E2 of each connection dielectric protrusion 45a constitute with an edge 21E1 of the pixel electrode 21 extending along the column direction is about 22.5 degrees.

An angle which the edges 45E3 and 45E4 of each connection dielectric protrusion 45a constitute with an edge 21E1 of the pixel electrode 21 extending along the column direction is greater than the angle (45°) which is constituted by the first axis and the edge 21E1 of the pixel electrode 21 extending along the column direction. In the example shown in FIG. 2B, the angle which the edges 45E3 and 45E4 of each connection dielectric protrusion 45a constitute with an edge 21E1 of the pixel electrode 21 extending along the column direction is about 90°. The edges 45E3 and 45E4 of the connection dielectric protrusions 45a intersect an edge 21E1 of the pixel electrode 21 extending along the column direction.

As described above, the linear dielectric protrusions 44 and linear apertures 22 are disposed axisymmetrically with respect to the line passing through the column-direction center of the pixel and extending along the row direction. The connection dielectric protrusions 45b existing in the lower half of the pixel have a structure such that they overlie the connection dielectric protrusions 45a existing in the upper half of the pixel when folded back along a fold line which is the line passing through the column-direction center of the pixel and extending along the row direction, and function in similar manners; therefore, their description is omitted here.

The connection dielectric protrusions 45c interconnect the first components 44a and second components 44b of the linear dielectric protrusions 44. Each connection dielectric protrusion 45c has edges 45E5, 45E6, and 45E7. The directions in which the edges 45E5 and 45E7 extend all differ from the direction (parallel to the first axis) in which the edges 44E1 and 44E2 of the first components 44a of the linear dielectric protrusions 44 extend, and differ from the direction (parallel to the second axis) in which the edges 44E3 and 44E4 of the second components 44b of the linear dielectric protrusions 44 extend. The edge 45E6 of each connection dielectric protrusion 45c is parallel to the column direction, and orthogonal to the row direction.

The connection dielectric protrusion 45c formed in the neighborhood of the column-direction center of each pixel of the liquid crystal display device 100A is shaped so as to protrude on the major-angle side of an angle formed by the first component 44a and the second component 44b of a linear dielectric protrusion 44. This connection dielectric protrusion 45c acts to prevent disorder in the alignment of the liquid crystal molecules near the center line.

As shown in FIG. 2A, a connection dielectric protrusion 45c is also formed at any portion at which the first component 44a and the second component 44b of the linear dielectric protrusions 44 belonging to pixels adjoining each other along the column direction are to be connected. A connection dielectric protrusion 45c formed at such a position will be discussed.

An angle which the edges 45E5 and 45E7 of the connection dielectric protrusion 45c constitute with an edge 21E2 of the pixel electrode 21 extending along the row direction is greater than 0° and smaller than the angle (45°) which the first axis and the second axis constitute with the edge 21E2 of the pixel electrode 21 extending along the row direction. In the example shown in FIG. 2A, the angle which the edges 45E5 and 45E7 of the connection dielectric protrusion 45c constitute with an edge 21E2 of the pixel electrode 21 extending along the row direction is about 22.5 degrees.

An angle which the edge 45E6 of the connection dielectric protrusion 45c constitutes with an edge 21E2 of the pixel electrode 21 extending along the row direction is greater than the angle (45°) which the first axis and the second axis constitute with the edge 21E2 of the pixel electrode 21 extending along the row direction. In the example shown in FIG. 2A, the angle which the edge 45E6 of the connection dielectric protrusion 45c constitutes with an edge 21E2 of the pixel electrode 21 extending along the row direction is about 90°. The edge 45E6 of the connection dielectric protrusion 45c intersects an edge 21E2 of the pixel electrode 21 extending along the row direction.

As described above, by disposing the connection dielectric protrusions 45a and 45b so as to overlap an edge 21E1 of the pixel electrode 21, the alignment direction of the liquid crystal molecules is restrained from becoming disorderly due to an oblique electric field that is generated near the edge 21E1 of the pixel electrode 21 (which exerts alignment regulation in an azimuth that is orthogonal to the edge 21E1 of the pixel electrode 21). Similarly, by disposing the connection dielectric protrusions 45c so as to overlap an edge 21E2 of the pixel electrode 21, the alignment direction of the liquid crystal molecules is restrained from becoming disorderly due to an oblique electric field that is generated near the edge 21E2 of the pixel electrode 21 (which exerts alignment regulation in an azimuth that is orthogonal to the edge 21E2 of the pixel electrode 21). An improved luminance is obtained by the connection dielectric protrusions 45a, 45b, and 45c suppressing disorder in the alignment of the liquid crystal molecules near the edges of the pixel electrode 21.

Herein, the connection dielectric protrusions 45a have a size as shown in FIG. 2C, for example. A distance Da1 between two adjoining connection dielectric protrusions 45a is 46 μm, and the connection dielectric protrusions 45a and 45b have a length Da2 of 29 μm and a width Da3 of 20 μm. The distance between adjoining connection dielectric protrusions 45a and 45b is greater than 46 μm. Moreover, the connection dielectric protrusions 45a and 45b, and 45c have an area of 4344 μm² per pixel, while occupying an area (excluding the areas of the portion between any two adjoining pixel electrodes (a region having a width of 7 μm) and the portion existing in a recess in the outer periphery of the pixel electrode) of 2805 μm² in one pixel.

In the liquid crystal display device 100A of the present embodiment, the distance Da1 between two adjoining connection dielectric protrusions 45a is greater than the distance between two adjoining auxiliary alignment regulating structures in the construction described in Patent Document 1, and thus there is a high design freedom as to the columnar spacer layout and the like. Hereinafter, this point will be described by way of Comparative Examples.

Figure 3:
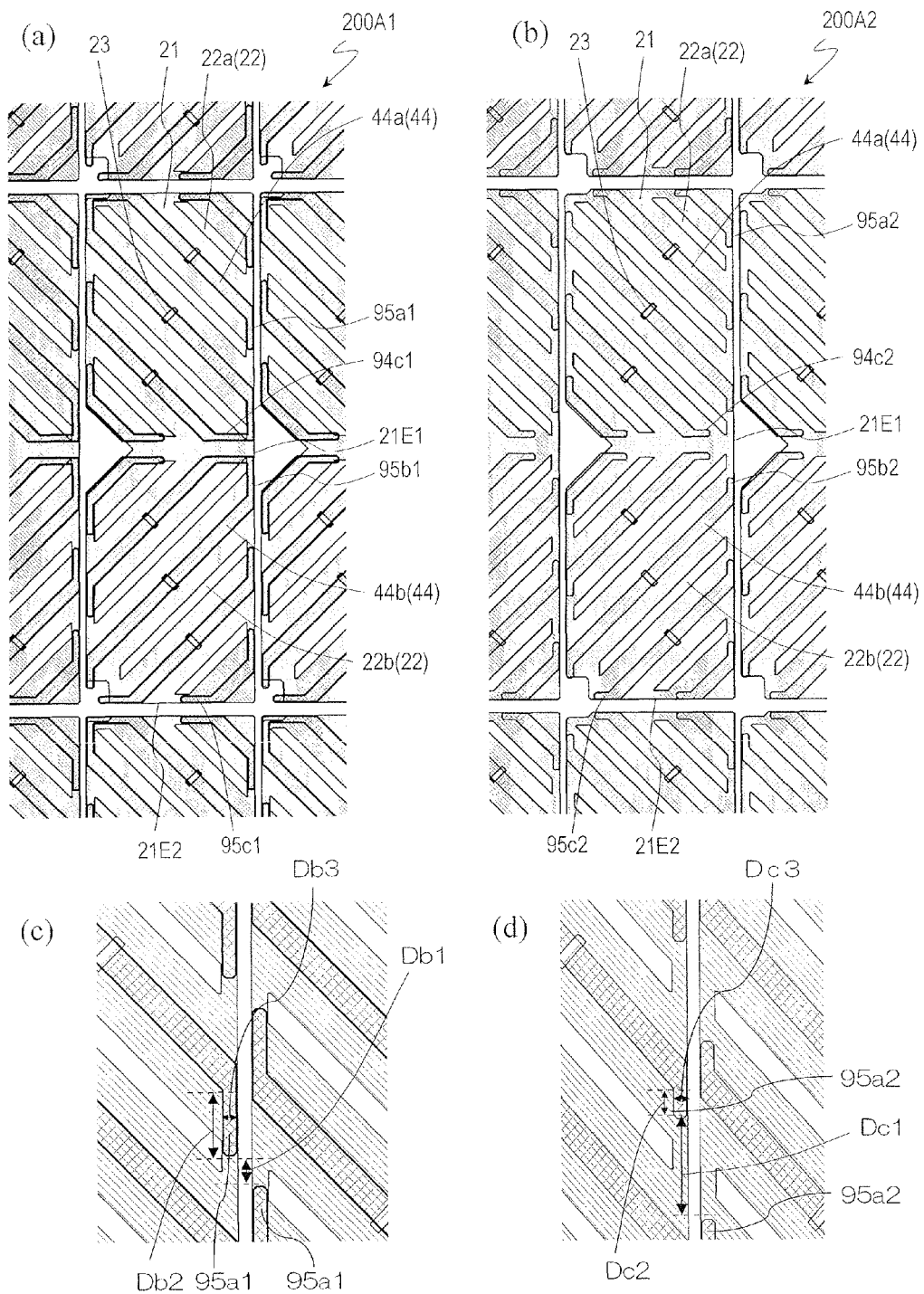
[FIGS. 3] (*a*) and (*b*) are plan views schematically showing the structure of a pixel of liquid crystal display devices 200A1 and 200A2 of Comparative Examples, respectively; and (*c*) and (*d*) are partially enlarged views of the neighborhood of the center of a pixel of the liquid crystal display devices 200A1 and 200A2 of Comparative Examples, respectively, for illustrating the size of auxiliary dielectric protrusions.

With reference to FIGS. 3(*a*) to (*d*), the structures of liquid crystal display devices of Comparative Examples which include the auxiliary alignment regulating structures described in Patent Document 1 (which herein are dielectric protrusions; hereinafter referred to as "auxiliary dielectric protrusions") will be described. FIG. 3(*a*) is a plan view schematically showing the structure of a pixel of a liquid crystal display device 200A1 of Comparative Example 1, and FIG. 3(*b*) is a plan view schematically showing the structure of a pixel of a liquid crystal display device 200A2 of Comparative Example 2. FIG. 3(c) is a partially enlarged view of the neighborhood of the center of the pixel shown in FIG. 3(a), and FIG. 3(d) is a partially enlarged view of the neighborhood of the center of the pixel shown in FIG. 3(b). Comparative Examples 1 and 2 both have the auxiliary alignment regulating structures described in Patent Document 1 (which herein are dielectric protrusions).

The linear apertures 22 and the linear dielectric protrusions 44 of the liquid crystal display devices 200A1 and 200A2 are of the same construction as in the liquid crystal display device 100A of the first embodiment shown in FIG. 2A, and the description thereof is omitted.

The liquid crystal display device 200A1 shown in FIG. 3(a) includes auxiliary dielectric protrusions 95a1, 95b1, and 95c1. Each auxiliary dielectric protrusion 95a1 is provided along an edge 21E1 of the pixel electrode 21 extending along the column direction, and formed continuous with the first component 44a of a linear dielectric protrusion 44. Each auxiliary dielectric protrusion 95b1 is provided along an edge 21E1 of the pixel electrode 21 extending along the column direction, and formed continuous with the second component 44b of a linear dielectric protrusion 44. Each auxiliary dielectric protrusion 95c1 is provided along an edge 21E2 of the pixel electrode 21 extending along the row direction, and is formed continuous with the second component 44b of a linear dielectric protrusion 44 in a lower half of the pixel, and formed continuous with the first component 44a of a linear dielectric protrusion 44 in an upper half of the pixel.

Moreover, near a center line of the axisymmetrical layout of the linear dielectric protrusions 44 and linear apertures 22 line passing through the column-direction center of the pixel and extending along the row direction), the liquid crystal display device 200A1 further includes auxiliary dielectric protrusions 94c1 extending along the row direction. Some of the auxiliary dielectric protrusions 94c1 are formed continuous with the first components 44a of the linear dielectric protrusions 44, while others are formed continuous with the second components 44b of the linear dielectric protrusions 44. Each auxiliary dielectric protrusion 94c1 is formed on the major-angle side of an angle which is constituted by extensions of the first components 44a and second components 44b of linear dielectric protrusions 44. Similarly to a connection dielectric protrusion 45c formed in the neighborhood of the column-direction center of a pixel of the liquid crystal display device 100A, the auxiliary dielectric protrusions 94c1 act to prevent disorder in the alignment of the liquid crystal molecules near the center line.

Similarly to the liquid crystal display device 200A1, the liquid crystal display device 200A2 shown in FIG. 3(b) includes auxiliary dielectric protrusions 95a2, 95b2, 95c2, and 94c2. However, the lengths of the auxiliary dielectric protrusions 95a2, 95b2, 95c2, and the auxiliary dielectric protrusions 94c2 are about half of the lengths of the auxiliary dielectric protrusions 95a1, 95b1, 95c1 and the auxiliary dielectric protrusions 94c1 of the liquid crystal display device 200A1.

Herein, the auxiliary dielectric protrusions 95a1, 95b1, 95a2, and 95b2 have sizes as shown in FIGS. 3(c) and (d), for example.

In FIG. 3(c), the distance Db1 between two adjoining auxiliary dielectric protrusions 95a1 is 13 μm. The auxiliary dielectric protrusions 95a1 and 95b1 have a length Db2 of 27.5 μm and a width Db3 of 6 μm. Moreover, the auxiliary dielectric protrusions 95a1, 95b1, 95c1 and 94c1 have an area of 3018 μm² per pixel, while occupying an area (excluding the areas of the portion between any two adjoining pixel electrodes (a region having a width of 7 μm) and the portion existing in a recess in the outer periphery of the pixel electrode) of 2921 μm² in one pixel.

In FIG. 3(d), the distance Dc1 between two adjoining auxiliary dielectric protrusions 95a2 is 42.5 μm. The auxiliary dielectric protrusions 95a2 and 95b2 have a length Dc2 of 12.75 μm and a width Dc3 of 6 μm. Moreover, the auxiliary dielectric protrusions 95a2, 95b2, 95c2, and 94c2 have an area of 1122 μm² per pixel, while occupying an area (excluding the area of the portion between any two adjoining pixel electrodes (a region having a width of 7 μm) and the portion existing in a recess in the outer periphery of the pixel electrode) of 1117 μm² in one pixel.

As has been described with reference to FIG. 2C, in the liquid crystal display device 100A according to an embodiment of the present invention, the distance Da1 between two adjoining connection dielectric protrusions 45a is 46 μm, which is greater than the distances Db1 and Dc1 (13 μm, 42.5 μm) between two adjoining auxiliary alignment regulating structures in the liquid crystal display device 200A1 and 200A2 of Comparative Examples, and thus there is a high design freedom as to the columnar spacer layout and the like.

In the liquid crystal display device 100A, the areas (4344 μm²) of the connection dielectric protrusions 45a and 45b per pixel are greater than the areas (3018 μm², 1122 μm²) of the auxiliary dielectric protrusions per pixel of the liquid crystal display device 200A1 or 200A2 of Comparative Examples, but the area (2805 μm²) which the connection dielectric protrusions 45a and 45b occupy in one pixel is smaller than the area (2921 μm²) which the auxiliary dielectric protrusions occupy in one pixel in the liquid crystal display device 200A1 of Comparative Example 1, thus indicative of a higher effective aperture ratio of the pixel than in the liquid crystal display device 200A1 of Comparative Example 1.

Now, design freedom, e.g., columnar spacer layout, will be discussed.

Generally speaking, in order to prevent a decrease in transmittance, columnar spacers are preferably disposed in a light shielding portion of the liquid crystal display device, and in order to prevent display disorder due to disorders in the alignment of the liquid crystal molecules, it is furthermore preferable to dispose them so as to avoid the central portion of the pixel. Each columnar spacer has a circular or polygonal cross-sectional shape, with a size (the diameter of a circle, or approximated by the diameter of a circumcircle in the case of a polygon) of 8 μm to 20 μm. When columnar spacers and dielectric protrusions are formed through a photolithography process by using a photosensitive resin, if the intervals between the columnar spacers and the dielectric protrusions are small, the development conditions and the like may locally fluctuate, so that the height or the like of one or both may deviate from the design value. If the height of the columnar spacers or the dielectric protrusions deviates from the design value, deteriorations in display quality may occur due to unevenness in thickness of the liquid crystal layer (retardation of the liquid crystal layer) or disorder in the alignment of the liquid crystal molecules. In particular, in the case where a plurality of columnar spacers are disposed within one pixel, or where main columnar spacers are employed together with subordinate columnar spacers which are lower in height than the main columnar spacers, the high layout density of columnar spacers makes it preferable to provide a large distance between dielectric protrusions so that spaces for disposing the columnar spacers are created.

Other than columnar spacers, an example of a structure protruding toward the liquid crystal layer may be a multilayer structure composed of a plurality of stacked color filter layers.

In order to allow such a multilayer structure to be disposed, too, it is preferable that there is a large distance between adjoining connection dielectric protrusions (auxiliary dielectric protrusions). The aforementioned multilayer structure may be employed in the following manners, for example: a multilayer structure of color filter layers being disposed on the liquid crystal layer side of a metal light-shielding film which is formed on TFTs; a multilayer structure of color filter layers being further provided on a light shielding layer which is made of a resin layer; and columnar spacers being composed of a stack of color filter layers.

Liquid crystal display devices of a 15-inch VGA type, having the structures of the liquid crystal display device 100A of Embodiment 1, the liquid crystal display device 200A1 of Comparative Example 1, and the liquid crystal display device 200A2 of Comparative Example 2 were prototyped, and were evaluated in terms of display luminance (transmittance). The prototyped liquid crystal display device have pixel pitches of 159 μm in the row direction and 477 μm in the column direction. The linear dielectric protrusions 44 (44a, 44b) have a width of 12 μm, whereas the linear apertures 22 (22a, 22b) have a width of 9 μm. When viewed from the normal direction of the substrate, the interval between the first component 44a of a linear dielectric protrusion 44 and the first component 22a of an adjoining linear aperture 22 and the interval between the second component 44b of a linear dielectric protrusion 44 and the second component 22b of an adjoining linear aperture 22 are 16 μm. The only difference in structure concerns the connection dielectric protrusions of the liquid crystal display device 100A and the auxiliary alignment regulating structures of the liquid crystal display devices 200A1 and 200A2, and the other constituents (e.g., the liquid crystal material, cell gap, black matrix, TFTs, and wiring line construction) are entirely identical.

When the transmittance in a white displaying state (applied voltage: 6.2V) was measured, the liquid crystal display device 100A of the first embodiment had a transmittance of 5.17%; the liquid crystal display device 200A1 of Comparative Example 1 had a transmittance of 5.16%; and the liquid crystal display device 200A2 of Comparative Example 2 had a transmittance of 5.10%. In other words, the liquid crystal display device 100A according to the first embodiment of the present invention has a transmittance which is the same as or higher than that of the liquid crystal display device 200A1 of Comparative Example 1, and a higher transmittance than that of the liquid crystal display device 200A2 of Comparative Example 2. In conventional constructions, if the auxiliary alignment regulating structures are shortened in length for enhancing design freedom, the auxiliary alignment regulating structures cannot sufficiently serve their function, whereby the transmittance will be lowered.

Thus, by adopting the connection dielectric protrusions of the present embodiment, the distance between two adjoining connection dielectric protrusions can be made longer than the distance between auxiliary dielectric protrusions in the liquid crystal display devices of Comparative Examples 1 and 2, and the same or higher transmittance can be obtained.

Next, with reference to FIG. 4A, FIG. 4B, FIG. 4C, and FIGS. 5(a)-(d), the construction of a liquid crystal display device according to a second embodiment of the present invention will be described in comparison with the construction of the liquid crystal display device described in Patent Document 1.

Figure 4A:
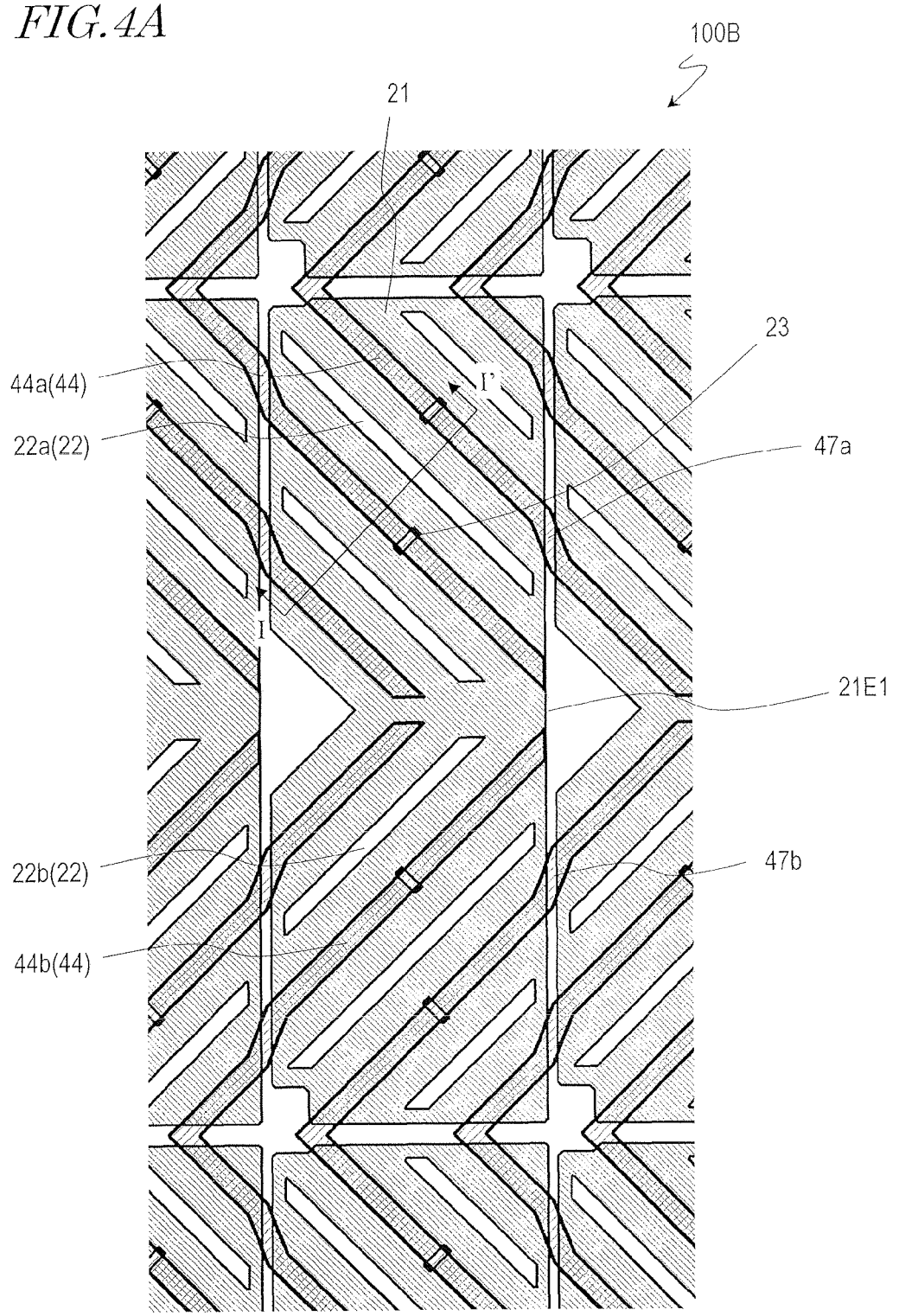
[FIG. 4A] A plan view schematically showing the structure of a liquid crystal display device 100B according to a second embodiment of the present invention pixel.
Figure 4B:
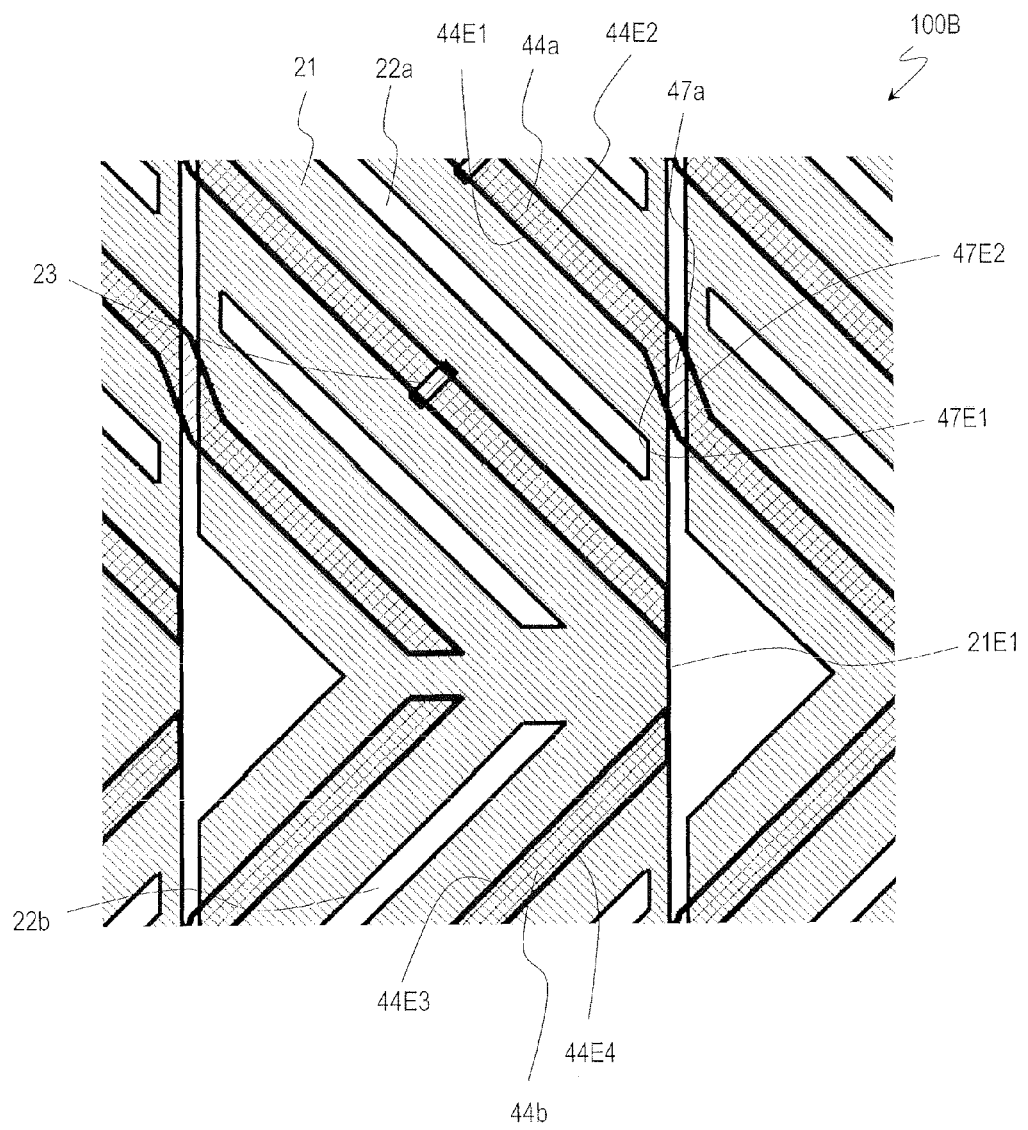
[FIG. 4B] A partially enlarged view of the neighborhood of the center of the pixel shown in FIG. 4A.
Figure 4C:
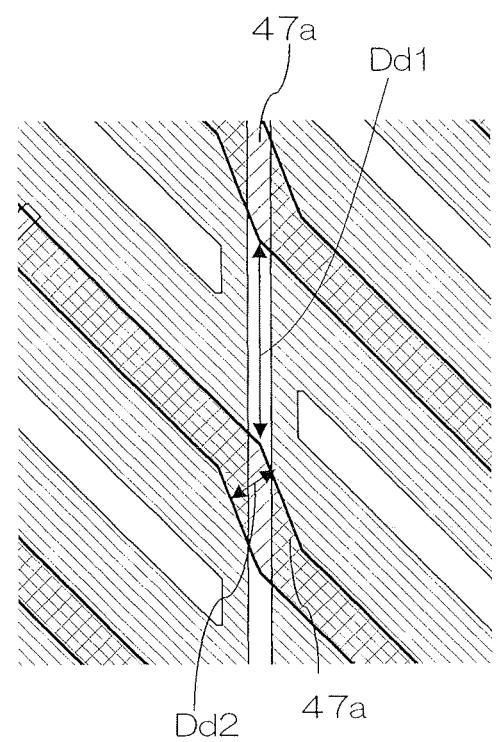
[FIG. 4C] A partially enlarged view of the neighborhood of the center of the pixel shown in FIG. 4A for illustrating the size of connection dielectric protrusions.

FIG. 4A is a plan view schematically showing the structure of a pixel of the liquid crystal display device 100B according to the second embodiment of the present invention. FIG. 4B and FIG. 4C are partially enlarged views of the neighborhood of the center of the pixel shown in FIG. 4A.

FIG. 4A shows a layout of: a pixel electrode 21 of the liquid crystal display device 100B according to the second embodiment of the present invention; a plurality of linear apertures (first linear alignment regulating structures) 22 formed on the pixel electrode 21; and a plurality of linear dielectric protrusions (second linear alignment regulating structures) 44 formed on the liquid crystal layer side of the counter electrode. The basic layout of the plurality of linear apertures 22 and the plurality of linear dielectric protrusions 44 is similar to that in the liquid crystal display device 100A of the first embodiment, and the structure of a cross section along line I-I' in FIG. 4A is equivalent to the cross-sectional structure shown in FIG. 1(a). However, in the liquid crystal display device 100A, the first components 22a of four linear apertures 22 and the first components 44a of five linear dielectric protrusions 44 are alternately disposed; on the other hand, in the liquid crystal display device 100B, the first components 22a of three linear apertures 22 and the first components 44a of four linear dielectric protrusions 44 are alternately disposed.

The liquid crystal display device 100B includes connection dielectric protrusions 47a and 47b formed on the liquid crystal layer side of the second substrate. The connection dielectric protrusions 47a and 47b connect the linear dielectric protrusions 44 belonging to a given pixel to those linear dielectric protrusions 44 which belong to a pixel adjoining the given pixel and which are not collinear with the linear dielectric protrusions of the given pixel. The connection dielectric protrusions 47a interconnect the first components 44a of the linear dielectric protrusions 44 belonging to pixels adjoining each other along the row direction, whereas the connection dielectric protrusions 47b interconnect the second components 44b of the linear dielectric protrusions 44 belonging to pixels adjoining each other along the row direction. The connection dielectric protrusions 47a and 47b have a plurality of edges, the plurality of edges including at least one edge extending in a direction which is different from the directions of the edges of the pixel electrode 21 and different from the directions of the edges of the linear dielectric protrusions 44. The connection dielectric protrusions 47a and 47b act to suppress disorder in the alignment of the liquid crystal molecules near an edge 21E1 of the pixel electrode 21 extending along the column direction, similarly to the auxiliary alignment regulating structures described in Patent Document 1.

With reference to FIG. 4B, the structure of the connection dielectric protrusions 47a and 47b will be described in more detail.

The first component 44a of a linear dielectric protrusion 44 has two edges 44E1 and 44E2. The two edges 44E1 and 44E2 extend along the first axis, and are parallel to each other. The first components 44a of the linear dielectric protrusions 44 belonging to pixels adjoining along the row direction are not collinear. In other words, even if the first component 44a of a linear dielectric protrusion 44 belonging to a given pixel is extended, it does not overlap (coincide with) the edges 44E1 and 44E2 of the first component 44a of any linear dielectric protrusion 44 belonging to any adjoining pixel along the row direction.

The second component 44b of a linear dielectric protrusion 44 has two edges 44E3 and 44E4. The two edges 44E3 and 44E4 extend along the second axis, and are parallel to each other. The second components 44b of the linear dielectric protrusions 44 belonging to pixels adjoining along the row direction are not collinear. In other words, even if the second component 44b of a linear dielectric protrusion 44 belonging to a given pixel is extended, it does not overlap (coincide with) the edges 44E3 and 44E4 of the second component 44b of any linear dielectric protrusion 44 belonging to any adjoining pixel along the row direction.

Each connection dielectric protrusion 47a has edges 47E1 and 47E2. The edges 47E1 and 47E2 all differ from the edges 44E1 and 44E2 of the first component 44a of any linear dielectric protrusion 44 in terms of the directions they extend. Although the connection dielectric protrusions 47a are formed integrally with the linear dielectric protrusions 44a, the directions in which their edges 47E1 and 47E2 extend are different from the direction (parallel to the first axis) in which the edges 44E1 and 44E2 of the first components 44a of the linear dielectric protrusions 44 extend, which makes the connection dielectric protrusions 47a identifiable.

An angle which the edges 47E1 and 47E2 of each connection dielectric protrusion 47a constitute with an edge 21E1 of the pixel electrode 21 extending along the column direction is greater than 0° and smaller than the angle (45°) which is constituted by the first axis and the edge 21E1 of the pixel electrode 21 extending along the column direction. In the example shown in FIG. 4B, the angle which the edges 47E1 and 47E2 of each connection dielectric protrusion 47a constitute with an edge 21E1 of the pixel electrode 21 extending along the column direction is about 22.5 degrees.

As described above, the linear dielectric protrusions 44 and linear apertures 22 are disposed axisymmetrically with respect to the line passing through the column-direction center of the pixel and extending along the row direction. The connection dielectric protrusions 47b existing in the lower half of the pixel have a structure such that they overlie the connection dielectric protrusions 47a existing in the upper half of the pixel when folded back along a fold line which is the line passing through the column-direction center of the pixel and extending along the row direction, and function in similar manners; therefore, their description is omitted here.

As described above, by disposing the connection dielectric protrusions 47a and 47b so as to overlap an edge 21E1 of the pixel electrode 21, the alignment direction of the liquid crystal molecules is restrained from becoming disorderly due to an oblique electric field that is generated near the edge 21E1 of the pixel electrode 21 (which exerts alignment regulation in an azimuth that is orthogonal to the edge 21E1 of the pixel electrode 21).

Herein, the connection dielectric protrusions 47a have a size as shown in FIG. 4C, for example. A distance Dd1 between two adjoining connection dielectric protrusions 47a is 54 μm, and the connection dielectric protrusions 47a and 47b have a width Dd2 of 12.4 μm. Moreover, the connection dielectric protrusions 47a and 47b occupy an area of 1649 μm² in one pixel, while occupying an area (excluding the area of the portion between any two adjoining pixel electrodes (a region having a width of 7 μm) and the portion existing in a recess in the outer periphery of the pixel electrode) of 478 μm² in one pixel.

In the liquid crystal display device 100B of the present embodiment, the distance Dd1 between two adjoining connection dielectric protrusions 47a is greater than the distance between two adjoining auxiliary alignment regulating structures in the construction described in Patent Document 1, and thus there is a high design freedom as to the columnar spacer layout and the like. Hereinafter, this point will be described by way of Comparative Examples.

Figure 5:
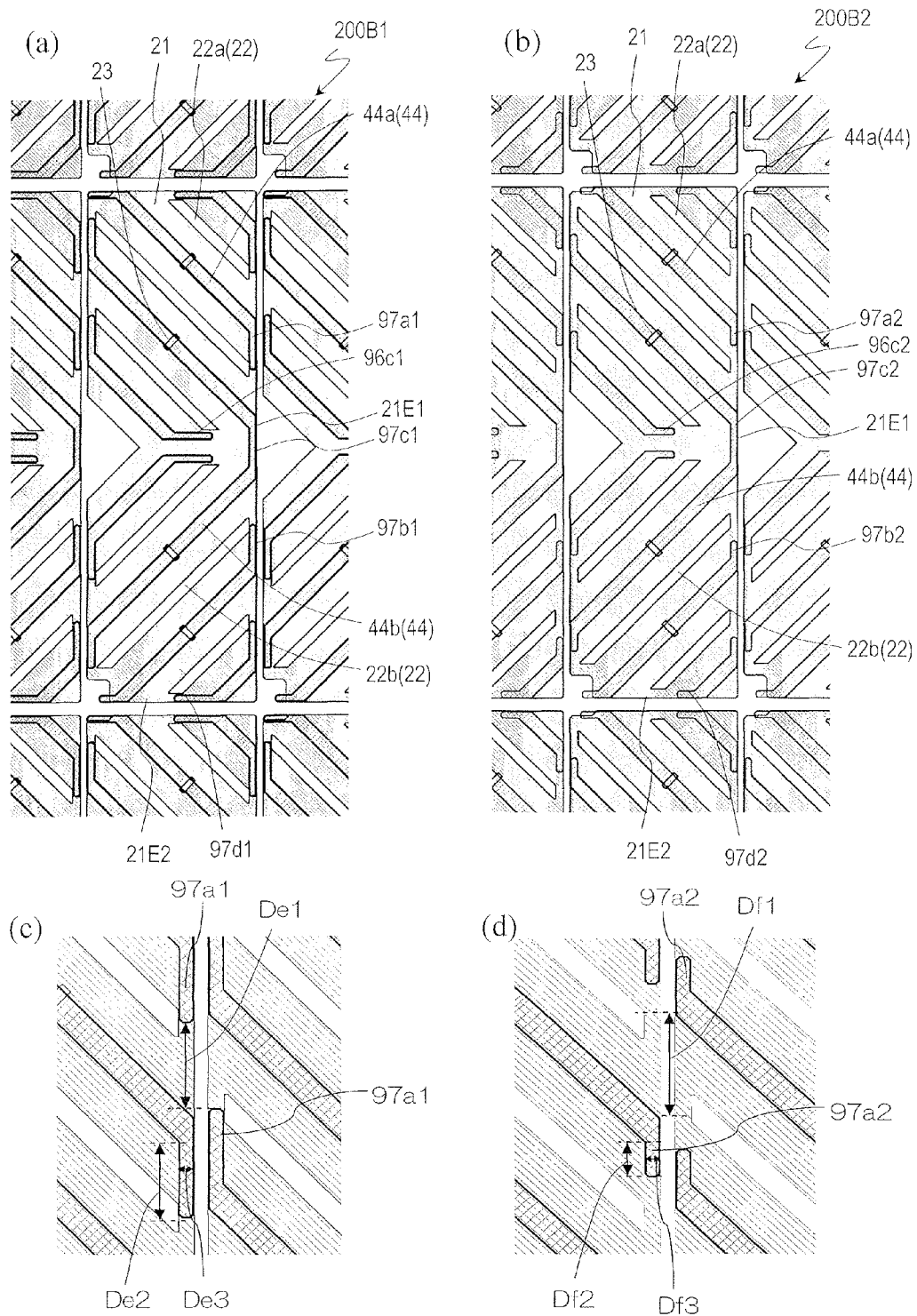
[FIGS. 5] (*a*) and (*b*) are plan views schematically showing the structure of a pixel of liquid crystal display devices 200B1 and 200B2 of Comparative Examples, respectively; and (*c*) and (*d*) are partially enlarged views of the neighborhood of the center of a pixel of the liquid crystal display devices 200B1 and 200B2 of Comparative Examples, respectively, for illustrating the size of auxiliary dielectric protrusions.

With reference to FIGS. 5(a)-(d), the structures of liquid crystal display devices of Comparative Examples which include the auxiliary alignment regulating structures described in Patent Document 1 (which herein are dielectric protrusions; hereinafter referred to as "auxiliary dielectric protrusions") will be described. FIG. 5(a) is a plan view schematically showing the structure of a pixel of a liquid crystal display device 200B1 of Comparative Example 3, and FIG. 5(b) is a plan view schematically showing the structure of a pixel of a liquid crystal display device 200B2 of Comparative Example 4. FIG. 5(c) is a partially enlarged view of the neighborhood of the center of the pixel shown in FIG. 5(a), and FIG. 5(d) is a partially enlarged view of the neighborhood of the center of the pixel shown in FIG. 5(b). Comparative Examples 3 and 4 both have the auxiliary alignment regulating structures described in Patent Document 1 (which herein are dielectric protrusions).

The linear apertures 22 and the linear dielectric protrusions 44 of the liquid crystal display devices 200B1 and 200B2 are of the same construction as in the liquid crystal display device 100B of the second embodiment shown in FIG. 4A, and the description thereof is omitted.

The liquid crystal display device 200B1 shown in FIG. 5(a) includes auxiliary dielectric protrusions 97a1, 97b1, 97c1, 97d1, and 96c1. Each auxiliary dielectric protrusion 97a1 is provided along an edge 21E1 of the pixel electrode 21 extending along the column direction, and formed continuous with the first component 44a of a linear dielectric protrusion 44. Each auxiliary dielectric protrusion 97b1 is provided along an edge 21E1 of the pixel electrode 21 extending along the column direction, and formed continuous with the second component 44b of a linear dielectric protrusion 44. Each auxiliary dielectric protrusion 97c1 is provided along an edge 21E1 of the pixel electrode 21 extending along the column direction, and is formed continuous with the second component 44b of a linear dielectric protrusion 44 in a lower half of the pixel, and formed continuous with the first component 44a of a linear dielectric protrusion 44 in an upper half of the pixel. Each auxiliary dielectric protrusions 97d1 is provided along an edge 21E2 of the pixel electrode 21 extending along the row direction, and is formed continuous with the first component 44a of a linear dielectric protrusion 44 in an upper half of the pixel, and formed continuous with the second component 44b of a linear dielectric protrusion 44 in a lower half of the pixel.

Moreover, near a center line of the axisymmetrical layout of the linear dielectric protrusions 44 and linear apertures 22 (a line passing through the column-direction center of the pixel and extending along the row direction), the liquid crystal display device 200B1 further includes auxiliary dielectric protrusions 96c1 extending along the row direction. Some of the auxiliary dielectric protrusions 96c1 are formed continuous with the first components 44a of the linear dielectric protrusions 44, while others are formed continuous with the second components 44b of the linear dielectric protrusions 44. Each auxiliary dielectric protrusion 96c1 is formed on the major-angle side of an angle which is constituted by extensions of the first components 44a and second components 44b of the linear dielectric protrusions 44. The auxiliary dielectric protrusions 96c1 act to prevent disorder in the alignment of the liquid crystal molecules near the center line.

Similarly to the liquid crystal display device 200B1, the liquid crystal display device 200B2 shown in FIG. 5(b) includes auxiliary dielectric protrusions 97a2, 97b2, 97c2, 97d2, and 96c2. However, the lengths of the auxiliary dielectric protrusions 97a2, 97b2, 97c2, 97d2, and 96c2 are about half of the lengths of the auxiliary dielectric protrusions 97a1, 97b1, 97c1, 97d1, and 96c1 of the liquid crystal display device 200B1.

Herein, the auxiliary dielectric protrusions 97a1, 97b1, 97a2, and 97b2 shown in FIGS. 5(c) and (d) have the following sizes, for example.

In FIG. 5(c), the distance De1 between two adjoining auxiliary dielectric protrusions 97a1 is 39 μm. The auxiliary dielectric protrusions 97a1 and 97b1 have a length De2 of 34 μm and a width De3 of 6 μm. Moreover, the auxiliary dielectric protrusions 97a1, 97b1, 97c1, 97d1, and 96c1 have an auxiliary dielectric protrusion area of 2529 μm² per pixel, while occupying an area (excluding the area of the portion between any two adjoining pixel electrodes (a region having a width of 7 μm) and the portion existing in a recess in the outer periphery of the pixel electrode) of 2395 μm² in one pixel.

In FIG. 5(d), the distance Df1 between two adjoining auxiliary dielectric protrusions 97a2 is 47 μm. The auxiliary dielectric protrusions 97a2 and 97b2 have a length Df2 of 15.75 μm and a width Df3 of 6 μm. Moreover, the auxiliary dielectric protrusions 97a2, 97b2, 97c2, 97d2, and 96c2 have an area of 1200 μm² per pixel, while occupying an area (excluding the area of the portion between any two adjoining pixel electrodes (a region having a width of 7 μm) and the portion existing in a recess in the outer periphery of the pixel electrode) of 1103 μm² in one pixel.

As has been described with reference to FIG. 4C, in the liquid crystal display device 100B according to an embodiment of the present invention, the distance Dd1 between two adjoining connection dielectric protrusions 47a is 54 μm, which is greater than the distance De1 or Df1 (39 μm, 47 μm) between two adjoining auxiliary alignment regulating structures in the liquid crystal display device 200B1 or 200B2 of Comparative Examples, and thus there is a high design freedom as to the columnar spacer layout and the like.

In the liquid crystal display device 100B, the area (1649 μm²) per pixel of the connection dielectric protrusions 45a and 45b is greater than the area (1200 μm²) per pixel of the auxiliary dielectric protrusions of the liquid crystal display device 200B2 of Comparative Example 4, but smaller than the area (2529 μm²) per pixel of the auxiliary dielectric protrusions of the liquid crystal display device 200B1 of Comparative Example 3. In this regard, too, the liquid crystal display device 100B has a higher design freedom as to the columnar spacer layout and the like than does the liquid crystal display device 200B1. Moreover, the area (478 μm²) which the connection dielectric protrusions 47a and 47b occupy in one pixel is smaller than the area (2395 μm²) which the auxiliary dielectric protrusions occupy in one pixel in the liquid crystal display device 200B1 of Comparative Example 3 or the area (1103 μm²) which the auxiliary dielectric protrusions occupy in one pixel in the liquid crystal display device 200B2 of Comparative Example 4, thus indicative of a high effective aperture ratio of the pixel.

Liquid crystal display devices of a 15-inch VGA type, having the structures of the liquid crystal display device 100B of Embodiment 2, the liquid crystal display device 200B1 of Comparative Example 3, and the liquid crystal display device 200B2 of Comparative Example 4 were prototyped, and evaluated in terms of display luminance (transmittance). The prototyped liquid crystal display devices have pixel pitches of 159 μm in the row direction and 477 μm in the column direction. The linear dielectric protrusions 44 (44a, 44b) have a width of 12 μm, whereas the linear apertures 22 (22a, 22b) have a width of 9 μm. When viewed from the normal direction of the substrate, the interval between the first component 44a of a linear dielectric protrusion 44 and the first component 22a of an adjoining linear aperture 22 and the interval between the linear dielectric protrusion 44 of a second component 44b and the second component 22b of an adjoining linear aperture 22 is 20.5 μm. The only difference in structure concerns the connection dielectric protrusions of the liquid crystal display device 100B and the auxiliary alignment regulating structures of the liquid crystal display devices 200B1 and 200B2, and the other constituents (e.g., the liquid crystal material, cell gap, black matrix, TFTs, and wiring line construction) are entirely identical.

When the transmittance in a white displaying state (applied voltage: 6.2V) was measured, the liquid crystal display device 100B of the second embodiment had a transmittance of 5.37%; the liquid crystal display device 200B1 of Comparative Example 3 had a transmittance of 5.36%; and the liquid crystal display device 200B2 of Comparative Example 4 had a transmittance of 5.33%. In other words, the liquid crystal display device 100B according to the second embodiment of the present invention has a transmittance which is the same as or higher than that of the liquid crystal display device 200B1 of Comparative Example 3, and a higher transmittance than that of the liquid crystal display device 200B2 of Comparative Example 4. As can be seen from the result of Comparative Example 4, if the auxiliary alignment regulating structures are shortened in length for an enhanced design freedom in the conventional construction, the function of the auxiliary alignment regulating structures cannot be sufficiently exhibited, thereby resulting in a lowered transmittance.

Thus, by adopting the connection dielectric protrusions of the present embodiment, it is possible to obtain a higher design freedom, e.g., columnar spacer layout, than with the liquid crystal display device of Comparative Examples 3 and 4, while achieving the same or higher transmittance.

Note that the liquid crystal display device according to embodiments of the present invention can be produced by known methods. As in the conventional linear dielectric protrusions, the linear dielectric protrusions and the connection dielectric protrusions can be formed with a photolithography technique, by using a photosensitive resin material (e.g., an acrylic resin, a polyimide-type resin, or a novolac-type resin), for example.

As described above, according to embodiments of the present invention, without lowering the display quality of an MVA-type liquid crystal display device, it is possible to provide an enhanced design freedom.

INDUSTRIAL APPLICABILITY

The present invention is broadly applicable to liquid crystal display devices of the traditional MVA mode, including liquid crystal display devices for use in TV sets.

REFERENCE SIGNS LIST 21 pixel electrode
22 linear aperture (first linear alignment regulating structure)
22a first component of linear aperture
22b second component of linear aperture
41 counter electrode
44 linear dielectric protrusion (second linear alignment regulating structure)
44a first component of linear dielectric protrusion
44b second component of linear dielectric protrusion
45a, 45b, 45c connection dielectric protrusion

The invention claimed is:
1. A liquid crystal display device comprising: a first substrate; a second substrate; a vertical-alignment type liquid crystal layer provided between the first substrate and the second substrate; a first electrode provided on the liquid crys- tal layer side of the first substrate; a second electrode provided on the liquid crystal layer side of the second substrate; and a plurality of pixels, wherein, each of the plurality of pixels includes a plurality of first linear alignment regulating structures provided on the liquid crystal layer side of the first substrate and a plurality of second linear alignment regulating structures provided on the liquid crystal layer side of the second substrate;

the plurality of first linear alignment regulating structures and the plurality of second linear alignment regulating structures each have a first component extending along a first axis and a second component extending along a second axis which is different from the first axis, the plurality of second linear alignment regulating structures being a plurality of linear dielectric protrusions;

the liquid crystal display device further comprises a connection dielectric protrusion provided on the liquid crystal layer side of the second substrate, the connection dielectric protrusion interconnecting a linear dielectric protrusion belonging to a given pixel and a linear dielectric protrusion which belongs to a pixel adjoining the given pixel and which is not collinear with the linear dielectric protrusion belonging to the given pixel; and the connection dielectric protrusion has a plurality of edges, the plurality of edges including at least one edge extending in a direction which is different from a direction of an edge of the first electrode and different from a direction of an edge of the linear dielectric protrusion.

2. The liquid crystal display device of claim 1, wherein the at least one edge of the connection dielectric protrusion includes at least one first edge such that an angle constituted by the at least one first edge and an edge of the first electrode extending along a column direction is greater than 0° and smaller than an angle constituted by the first axis or second axis and the edge of the first electrode extending along the column direction.

3. The liquid crystal display device of claim 2, wherein, the angle constituted by the first axis or second axis and the edge of the first electrode extending along the column direction is about 45°; and the angle constituted by the at least one first edge of the connection dielectric protrusion and the edge of the first electrode extending along the column direction is about 22.5 degrees.

4. The liquid crystal display device of claim 2, wherein the at least one first edge of the connection dielectric protrusion intersects the edge of the first electrode extending along the column direction.

5. The liquid crystal display device of claim 2, wherein the at least one edge of the connection dielectric protrusion further includes at least one second edge such that an angle constituted by the at least one second edge and the edge of the first electrode extending along the column direction is greater than the angle constituted by the first axis or second axis and the edge of the first electrode extending along the column direction.

6. The liquid crystal display device of claim 5, wherein the angle constituted by the at least one second edge of the connection dielectric protrusion and the edge of the first electrode extending along the column direction is about 90°.

7. The liquid crystal display device of claim 5, wherein the at least one second edge of the connection dielectric protrusion intersects the edge of the first electrode extending along the column direction.

* * * * *